US008066235B1

(12) United States Patent
Evans

(10) Patent No.: US 8,066,235 B1
(45) Date of Patent: Nov. 29, 2011

(54) ADJUSTABLE WORK STAND FOR MOTORCYCLES

(76) Inventor: Drummond G. Evans, Pleasant Hill, OR (US)

( * ) Notice: Subject to any disclaimer, the term of this patent is extended or adjusted under 35 U.S.C. 154(b) by 640 days.

(21) Appl. No.: 12/221,844

(22) Filed: Aug. 6, 2008

(51) Int. Cl.
*F16M 11/00* (2006.01)

(52) U.S. Cl. ............... 248/176.3; 248/188.2; 248/125.1; 108/116

(58) Field of Classification Search ............... 248/176.3, 248/188.2, 188.4, 122.1, 125.1, 125.2, 125.8, 248/649, 650; 108/116, 144.11, 147.19
See application file for complete search history.

(56) References Cited

U.S. PATENT DOCUMENTS 3,848,544 A * 11/1974 Douglas ............................ 108/6
6,314,893 B1 * 11/2001 Lee ............................... 108/119
7,059,616 B2 * 6/2006 Wu ............................ 280/47.24
7,222,838 B1 * 5/2007 Ji .................................... 254/88
7,243,896 B2 * 7/2007 Zhang ........................... 248/676
7,540,047 B2 * 6/2009 Lambarth .......................... 5/611
2004/0079855 A1 * 4/2004 Strabel, III .................... 248/650

* cited by examiner

*Primary Examiner* — Terrell McKinnon
*Assistant Examiner* — Steven Marsh
(74) *Attorney, Agent, or Firm* — Robert E. Howard

(57) ABSTRACT

An adjustable work stand for motorcycles includes a platform and platform support means. The platform support means includes left and right vertical support members adapted to be adjustable upwardly and downwardly. Upper and lower horizontal support members extend between the vertical support members. The platform is pivotally attached to the upper horizontal support member. A vertically adjustable platform support arm extends between the lower horizontal support member and the underside of the front of the platform. A stand support arm extends rearwardly from one of the left and right vertical support members, the forward end of the stand support arm being pivotally connected to the vertical support member, the rearward end of the stand support arm adapted to contact the same surface upon which the vertical support members rest.

7 Claims, 2 Drawing Sheets

ADJUSTABLE WORK STAND FOR MOTORCYCLES

BACKGROUND OF THE INVENTION

The present invention relates to an adjustable work stand for motorcycles.

For cleaning, maintenance, and repair of a motorcycle it is convenient to be able to lift the front or rear wheel off the ground to an elevated position for easier access. For this purpose a number of static work stands have been proposed. Such stands typically require that the user lift the motorcycle onto an awkwardly configured work stand, which can be difficult due to the size and weight of the motorcycle. The user is also at the mercy of the angle of the motorcycle undercarriage and the angle of the top of the stand which dictate which wheel, if either, is above the ground.

SUMMARY OF THE INVENTION

It is an object of the present invention to provide an adjustable work stand for a motorcycle (hereinafter sometimes referred to as a "bike") which uses leverage to lift the bike and place its undercarriage onto a platform, the angle of which can be adjusted, to thereby raise either the front wheel or rear wheel off of the ground.

It is a further object of the present invention to provide a work stand for a motorcycle where the height of the platform can be vertically adjusted to minimize the distance the bike has to be raised off the ground.

It is a still further object of the present invention to provide a work stand for a motorcycle that can be collapsed for easy transport and storage.

The adjustable work stand of the present invention includes a platform and platform support means.

The platform support means includes left and right vertical support members, and left and right adjustable rods extending downwardly from the lower ends of the vertical support members and adapted to be adjustable upwardly and downwardly. Upper and lower horizontal support members extend between the left and right vertical support members.

The platform is pivotally attached to the upper horizontal support member. Means for adjusting the angle of the platform from the horizontal, includes a vertically adjustable platform support arm extending between the lower horizontal support member and the mid-portion of the underside of the front of the platform.

A stand support arm extends rearwardly from one of the left or right vertical support members, the forward end of the stand support arm being pivotally connected to the vertical support member. The stand support arm extends rearwardly at an angle adapted to allow the platform to be placed under the undercarriage of a motorcycle when the stand support arm is substantially horizontal to the supporting surface, and to raise either the front wheel or the rear wheel of the motorcycle, depending on the angle of the platform, when the outer end of the stand support arm is lowered into contact with the supporting surface.

A strut extends rearwardly from the same left or right vertical support member, the forward end of the strut being pivotally attached thereto. The rearward end of the strut is attached to the stand support arm.

DESCRIPTION OF PREFERRED EMBODIMENTS

Figure 1:
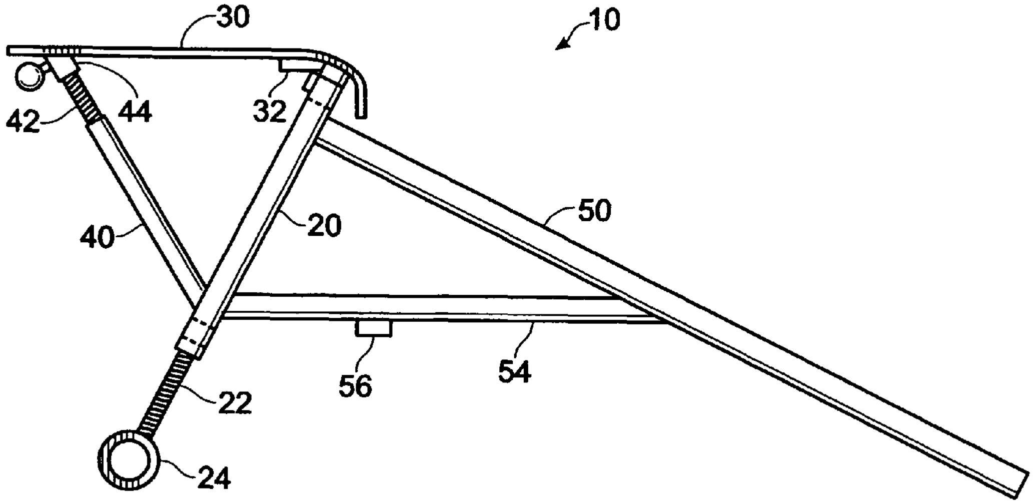
FIG. 1 is a left side elevation view of the adjustable bike stand of the present invention, shown in its fully erected configuration.

The adjustable work stand 10 includes left vertical support member 20 and right vertical support member 20'. Left and right vertical support members 20 and 20' are hollow and identical.

Left and right adjustable rods 22, 22' extend downwardly from the lower ends of left and right vertical support members 20, 20', respectively. Left and right adjustable rods 22, 22' extend into the interiors of left and right vertical support members 20, 20' and are vertically adjustable inwardly and outwardly. Left and right feet members 24, 24' are attached to the outer ends of left and right adjustable rods 22, 22', respectively.

Upper and lower horizontal support members 26, 26' extend between, and are attached to, left and right vertical support members 20, 20'.

The rearward edge of a platform 30 is attached to upper horizontal support member 26 by hinge members 32, 32', respectively.

The lower end of a hollow platform support arm 40 is attached to lower horizontal support member 26' by hinge means (not shown). An adjustable platform support rod 42 extends outwardly and upwardly from the upper end of platform support arm 40. Adjustable platform support rod 42 extends into the interior of platform support arm 40 and is vertically adjustable inwardly and outwardly. The outer end of platform support rod 42 is releasably attached to the underside of the forward end of platform 30 by insertion into the socket of a latch pin receiving assembly 44 located on the underside of platform 30.

A stand support arm 50 extends rearwardly from left vertical support member 20 at an angle of substantially 90 degrees or more thereto. The forward end of stand support arm 50 is pivotally connected to left vertical support member 20 adjacent its upper end by a hinge 52 (as best seen in FIG. 4). A locking spreader hinge 55 (sometimes referred to as a "ladder hinge") extends between, and is connected at its outer ends to, stand support arm 50 and horizontal support member 26, and releasably locks stand support arm 50 in its fully extended position shown in FIGS. 1 and 3. The rearward end of stand support arm 50 rests on the same surface as left and right feet 24, 24' of vertical support members 22, 22'.

A strut 54 is connected at its outer end to stand support arm 50, and is pivotally connected at its inner end to left vertical support member 20 by hinge means 53 (as seen in FIG. 4). Strut 54 is pivotally connected at its first end to left vertical support member 20, and connected to stand support arm 50 at its other end. A latch pin assembly 56 is attached to the inner surface of strut 54.

Although stand support arm 50 and strut 54 are shown and described as extending outwardly from left vertical support member 20, they could extend outwardly from right vertical support member 20' and be configured as the mirror image of stand support arm 50, strut 54, and associated hinges 52 and 53.

Figure 2:
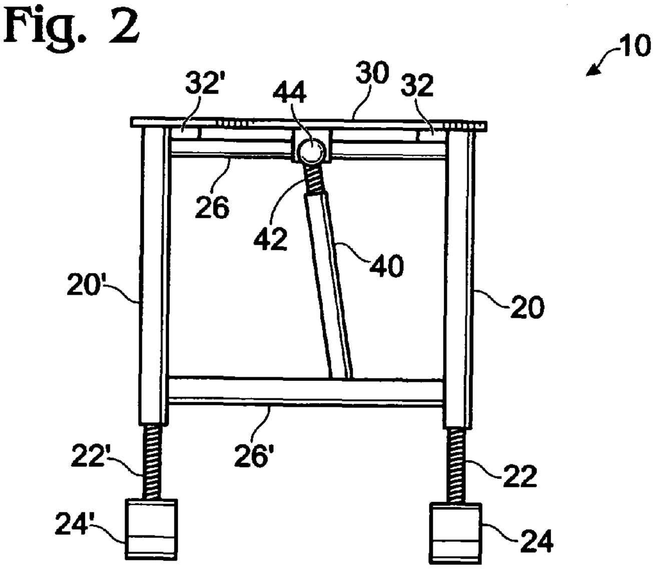
FIG. 2 is a front elevation view of the adjustable bike stand, shown in its fully erected configuration.
Figure 3:
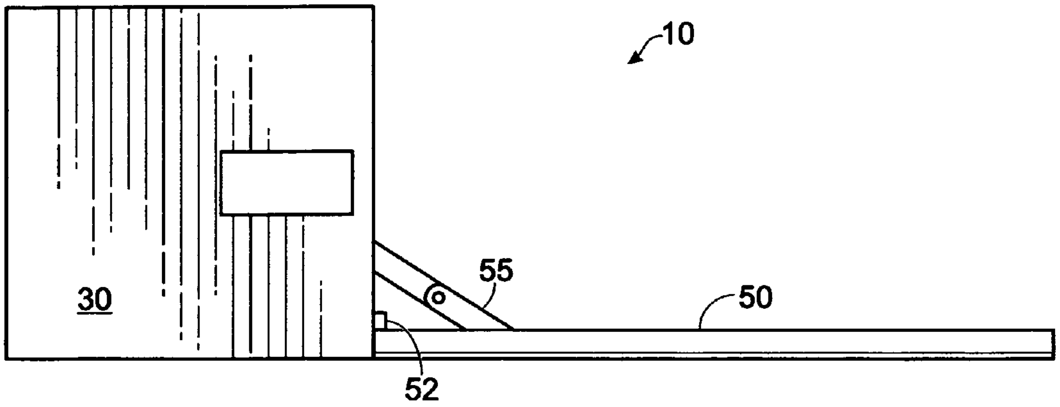
FIG. 3 is a top plan view of the adjustable bike stand, shown in its fully erected configuration.
Figure 4:
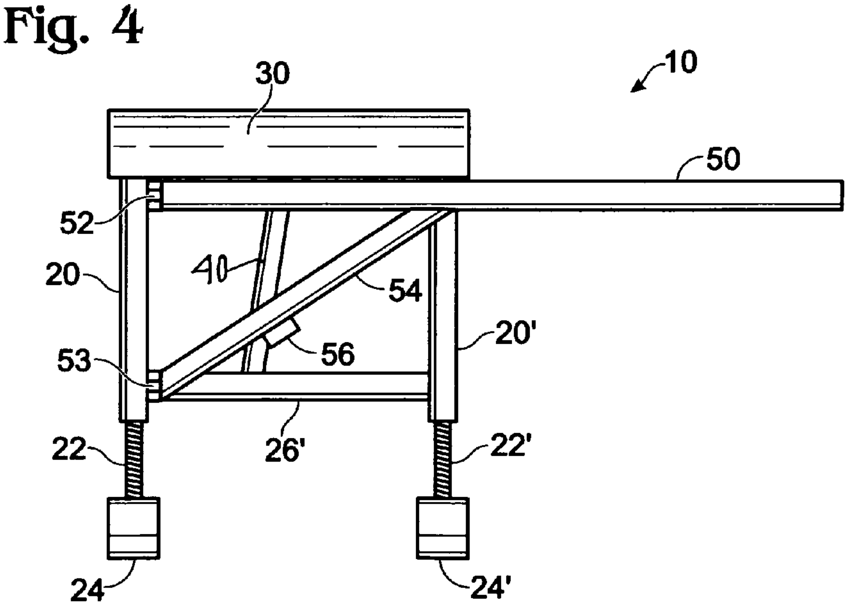
FIG. 4 is a rear elevation view of the adjustable bike stand shown in its folded configuration.

In use, and with adjustable bike stand 10 in its fully erected position as shown in FIGS. 1-3, but with stand support arm 50 being raised into a substantially horizontal position, the stand

10 is placed under the motor area of the bike with the rear portion of platform 30 being in contact with the undercarriage portion of the bike. The stand support arm 50 is then pushed downwardly until the stand support arm 50 rests on the same surface as left and right feet 24, 24', thereby lifting the bike with the undercarriage of the bike being seated on platform 30.

The angle of platform 30 to the horizontal can be adjusted upwardly or downwardly by adjusting platform support rod 42. The overall height of platform 30 can be adjusted upwardly or downwardly by means of right and left adjustable rods 22, 22'.

After use, adjustable bike stand 10 can be collapsed into a compact configuration for storage or transport, as seen in FIG. 4. This is accomplished by releasing platform 30 from adjustable platform support rod 42 by pulling the ring of the latch pin receiving assembly 44, pushing platform support rod 42 and platform vertical support arm 40 in towards the upper horizontal support member 26, and then tilting platform 30 downwardly to a substantially vertical position. Locking spreader hinge 55 is unlocked and stand support arm 50 and attached strut 54 are then moved inwardly towards the rear of right vertical support member 20' until contact is made. Stand support arm 50 and attached strut 54 are held in place by inserting the latch pin of latch pin assembly 56 into latch pin receiving assembly 44 located on the underside of platform 30. This is the reason platform support arm 40 is offset from center at its point of attachment to lower horizontal support member 26'.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An adjustable work stand for motorcycles having an undercarriage and front and rear wheels comprising:

support means including left and right vertical support members, each of said left and right vertical support members being hollow and having upper and lower ends, left and right adjustable rods extending downwardly from the lower ends of said left and right vertical support members and adapted to be adjustable upwardly and downwardly, and upper and lower horizontal support members extending between said left and right vertical support members;

a raised platform pivotally attached to said upper horizontal support member and adapted to receive the undercarriage of a motorcycle;

means for adjusting the angle of said platform to the horizontal, including means for raising or lowering the front of said platform;

a stand support arm extending rearwardly from one of said left and right vertical support members, said stand support arm having a forward end and a rearward end, the forward end of said stand support arm being pivotally connected to said one of said left and right vertical support members, the rearward end of said stand support arm adapted to contact the same surface upon which said left and right vertical support members rest.

2. The work stand of claim 1 wherein said stand support arm extends rearwardly from one of said left and right vertical support members at an angle adapted to allow said platform to be placed under the undercarriage of a motorcycle when said stand support arm is substantially horizontal to the supporting surface, and to raise either the front wheel or the rear wheel of the motorcycle, depending on the angle of said platform, when the outer end of said stand support arm is lowered into contact with said supporting surface.

3. The work stand of claim 2 wherein said stand support arm extends rearwardly from one of said left and right vertical support members at an angle of substantially 90 degrees thereto.

4. The work stand of claim 2 including a strut extending rearwardly from the same one of said left and right vertical support members, the forward end of said strut being pivotally attached thereto, the rearward end of said strut being attached to said stand support arm.

5. An adjustable work stand for motorcycles having an undercarriage and front and rear wheels comprising:

support means including left and right vertical support members, each of said left and right vertical support members being hollow and having upper and lower ends, left and right adjustable rods extending downwardly from the lower ends of said left and right vertical support members and adapted to be adjustable upwardly and downwardly, and upper and lower horizontal support members extending between said left and right vertical support members;

a platform pivotally attached to said upper horizontal support member by hinge means;

means for adjusting the angle of said platform from the horizontal, including a platform support arm and an adjustable platform support rod extending therefrom, said platform support arm and said adjustable platform support rod extending between said lower horizontal support member and the underside of said platform;

a stand support arm extending rearwardly from one of said left and right vertical support members, said stand support arm having a forward end and a rearward end, the forward end of said stand support arm being pivotally connected to said one of said left and right vertical support members, the rearward end of said stand support arm adapted to contact the same surface upon which said left and right vertical support members rest; and a strut extending rearwardly from the same one of said left and right vertical support members, the forward end of said strut being pivotally attached thereto, the rearward end of said strut being attached to said stand support arm.

6. The work stand of claim 5 wherein said stand support arm extends rearwardly from one of said left and right vertical support members at an angle adapted to allow said platform to be placed under the undercarriage of a motorcycle when said stand support arm is substantially horizontal to the supporting surface, and to raise either the front wheel or the rear wheel of the motorcycle, depending on the angle of said platform, when the outer end of said stand support arm is lowered into contact with said supporting surface.

7. The work stand of claim 5 wherein said stand support arm extends rearwardly from one of said left and right vertical support members at an angle of substantially 90 degrees thereto.

* * * * *